United States Patent [19]

Rigby et al.

[11] 4,436,618
[45] Mar. 13, 1984

[54] RECOVERY OF COAL FROM COAL HANDLING OPERATIONS

[75] Inventors: Geoffrey R. Rigby, Charlestown; Thomas G. Callcott, Mayfield, both of Australia

[73] Assignee: The Broken Hill Proprietary Company Limited, Melbourne, Australia

[21] Appl. No.: 340,779

[22] Filed: Jan. 19, 1982

Related U.S. Application Data

[63] Continuation-in-part of Ser. No. 127,107, Mar. 4, 1980, abandoned.

[30] Foreign Application Priority Data

Mar. 5, 1979 [AU] Australia ............................. PD7887

[51] Int. Cl.³ ............................................. B03D 3/06
[52] U.S. Cl. ........................................ 209/5; 210/729; 210/730; 210/738; 44/15 R; 209/250
[58] Field of Search ...................... 209/5, 49, 250, 281, 209/273; 210/728-730, 738; 44/1 R, 1 A, 15 R, 24; 366/263-265; 23/313 R, 314; 417/900

[56] References Cited

U.S. PATENT DOCUMENTS

| | | | |
|---|---|---|---|
| 2,778,499 | 1/1957 | Chamberlain et al. | 209/170 X |
| 2,987,386 | 6/1961 | Chapman et al. | 48/196 |
| 3,016,986 | 1/1962 | Dille et al. | 183/121 |
| 3,147,093 | 9/1964 | Dille et al. | 48/215 |
| 3,856,668 | 12/1974 | Shubert | 210/54 R |
| 4,033,729 | 7/1977 | Capes et al. | 44/1 A |
| 4,089,776 | 5/1978 | McMurray | 209/5 |
| 4,209,301 | 6/1980 | Nicol et al. | 44/24 |
| 4,229,293 | 10/1980 | Caswell et al. | 209/5 X |

FOREIGN PATENT DOCUMENTS

| | | |
|---|---|---|
| 516645 | 4/1921 | France . |
| 552344 | 4/1923 | France . |
| 575222 | 7/1924 | France . |
| 1048903 | 12/1953 | France . |
| 1072527 | 9/1954 | France . |
| 1275564 | 10/1961 | France . |
| 1333251 | 6/1963 | France . |
| 1345193 | 10/1963 | France . |

OTHER PUBLICATIONS

Agglomeration 77, vol. 2, KVS Sastry, Ed., AM Inst. of Mining, Metallurgical & Pet. Engrs., Inc., N.Y., NY, 1977, Ch. 54, pp. 921-926.

Primary Examiner—Ralph J. Hill
Attorney, Agent, or Firm—Murray and Whisenhunt

[57] ABSTRACT

This specification discloses a greatly simplified method and system for recovering coal from a particulate coal bearing slurry (1) in which an appropriate hydrophobic liquid or emulsion of hydrophobic liquid in water (2) is introduced into the inlet of a centrifugal turbulent flow slurry pump (3) simultaneously with the introduction of said coal bearing slurry to said pump inlet, said hydrophobic liquid being introduced in a quantity sufficient to achieve substantially intimate contact between said hydrophobic liquid and coal particles in said slurry whereby the coal may be separated from the slurry by discharging the slurry from the pump directly over a simple static screen or other suitable separating device (4) whereupon the separated coal matter (5) may be collected for subsequent use. If desired, the coal within said slurry may be additionally agitated in any suitable manner, such as by means of an in-line flow promoting device (7) which causes additional contact between the agglomerates produced by the agitation achieved within the slurry pump (3).

13 Claims, 1 Drawing Figure

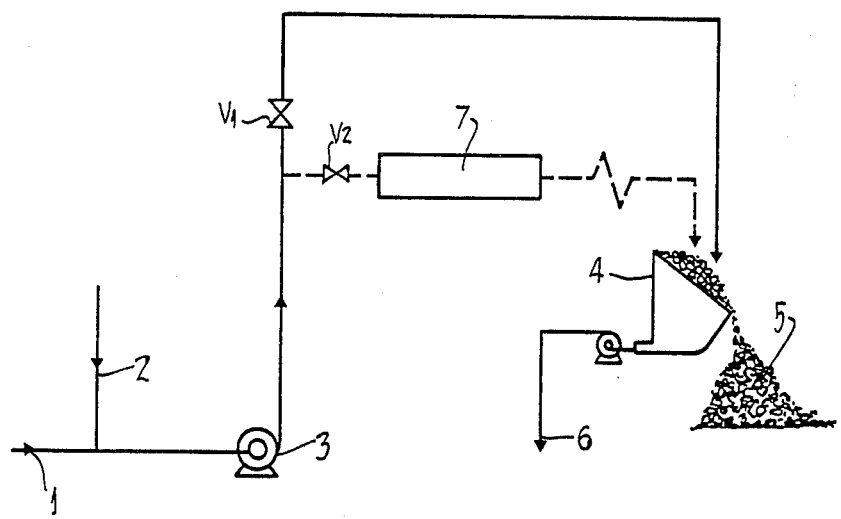

RECOVERY OF COAL FROM COAL HANDLING OPERATIONS

This application is a continuation-in-part of Ser. No. 127,107, Mar. 4, 1980, now abandoned.

BACKGROUND OF THE INVENTION

This invention relates to the recovery and/or beneficiation of coal from a slurry containing coal in water.

The invention is particularly applicable to the recovery of coal from a slurry pipeline used for transportation of the coal and also to the recovery and beneficiation of coal from a variety of slurries produced in washing and beneficiating operations. Specific examples include intermediate and waste slurries produced from fine coal washing circuits where a considerable amount of valuable coal matter is frequently discharged into ponds and other disposal areas, and also slurries produced by crushing coarse coal washery reject material (such as that rejected from a dense medium cyclone).

In the case of pipeline slurries used for the transportation of coal, the coal is normally dewatered using conventional equipment such as centrifuges or vacuum filters. Whilst these techniques may be suitable for handling coals for power generation at a captive generation station, they are not suitable for handling many coking coals. For coking coals, the presence of clays and other mineral matter can result in a serious deterioration of coking properties of the coal if not removed from the coal in the dewatering operation. (See Rigby, G. R. and Callcott, T. G., "A System for the Transportation, Cleaning and Recovery of Australian Coking Coals", Paper E5, Fifth International Conference on the Hydraulic Transport of Solids in Pipes, Hanover, May 1978 (1)). Conventional dewatering equipment cannot recover coal in this manner without significant loss of fine coal.

The invention involves the application of selective agglomeration techniques to the coal recovery operation. In this technique, the coal matter being hydrophobic can be readily separated from the hydrophilic clays and mineral matter suspended in the slurry by the addition of an appropriate "oil". The "oil" being hydrophobic, collects the coal, and with the appropriate contacting pattern provided by this invention, can be formed into agglomerates which are readily separated from the non-hydrophobic mineral components in the aqueous suspension.

The "oil" used in the operation can consist of a wide variety of liquid hydrocarbons such as kerosene, diesel oil, fuel oil, petroleum residues through to heavy aromatic materials such as coke oven tars and bitumen together with various mixtures.

Emulsification of the oil with water in some cases has been shown to provide more efficient operation (see for example Australian Pat. No. 221,773).

Many publications and patents have discussed the recovery of coal and other carbonaceous material from various slurries using selective agglomeration techniques; for example see:

Lemke, K., "The Cleaning and De-watering of Slurries by the Convertol Process", 2nd Int. Coal Prep. Congr. Essen, Germany, 1974. (2)

Capes, C. E., McIlhinney, A. E. and Coleman, R. D., "Beneficiation and Balling of Coal", Soc. Min. Engrs. AIME, Trans., 247, pp 233-7 (1970). (3)

Swanson, A. R., Nicol, S. K. and Bensley, C. N., "Selective Agglomeration-A Solution to Problems in the Efficient Treatment of Fine Coal", Chemeca 77 Conference, Canberra, Sept., 1977. (4)

U.S. Pat. No. 3,856,668. (5)

Zuiderweg, F. J. and Lookeren Campagne, N. van, "Pelletizing of Soot in Waste Water of Oil Gasification Plant-The Shell Pelletizing Separator" (S.P.S.)", Chem. Eng., CE 223-6, July/Aug. 1968. (6) However these techniques have generally involved the use of complex mixing chambers and/or tanks, or other substantial agglomerating devices to achieve the desired degree of beneficiation and agglomeration of the coal so that adequate separation from the liberated mineral matter could be achieved.

It is the object of the present invention to provide a greatly simplified means of achieving separation of coal from coal bearing slurries.

BRIEF SUMMARY OF THE INVENTION

The invention provides a method of recovering coal from a particulate coal bearing slurry comprising agitating said slurry in the presence of an appropriate hydrophobic liquid and subsequently separating coal from the slurry, characterized by the steps of introducing the slurry to the inlet of a turbulent flow slurry pump having a pumping chamber, and introducing said hydrophobic liquid into said pumping chamber simultaneously with said slurry and in a quantity sufficient to achieve substantially intimate contact between said hydrophobic liquid and said coal particles, whereby the coal may be separated from the slurry liquid and whereby the time taken for the recovery of the coal from the slurry liquid is substantially reduced.

The method of the present invention provides a simple means of effecting the liberation of coal from a slurry and at the same time produces a product which can be readily separated from the water and suspended mineral matter using simple recovery techniques. The invention therefore allows for significant beneficiation of the coal to be achieved during the recovery operation. In the case of a pipeline slurry used for transportation of the coal, this beneficiation can eliminate the need for a conventional beneficiation or washing operation.

The invention also provides a system for recovering coal from a particulate coal bearing slurry comprising a pipeline for carrying the slurry, means for pumping said slurry through said pipeline, and means for separating coal from the slurry, characterized in that said pumping means comprises a turbulent flow slurry pump having a pumping chamber connected to said pipeline, means for introducing an appropriate hydrophobic liquid to the pumping chamber of said pump simultaneously with the introduction of said slurry into said pumping chamber in a metered quantity sufficient to achieve substantially intimate contact between the hydrophobic liquid and the coal particles in said slurry, whereby the coal particles may be separated from slurry by said separating means and whereby the time taken for the recovery of the coal from said slurry is substantially reduced.

In certain cases, the above method and system may produce a coal product which is ready for use. If necessary however, the slurry may be further agitated or treated in some other form of agglomerating device to achieve additional contact between the coated coal aggregates produced by the method whereby larger coal agglomerates are produced. Any one of many known devices may be used for this purpose, although in line agglomerating devices offer the advantage of a greater degree of continuity of the recovery system. Similarly, it may be necessary, depending on the nature of the hydrophobic liquid used and the end product requirements, to remove all or part of this hydrophobic liquid from the aggregates produced by the method or from the agglomerates produced by further treatment.

BRIEF DESCRIPTION OF THE DRAWING

One preferred from of the invention is illustrated schematically in the single FIGURE of the accompanying drawing and is explained in the following description.

DESCRIPTION OF THE PREFERRED EMBODIMENT

An aqueous coal slurry 1 is provided from a pipeline, pond, storage chamber or process unit to the inlet of a pump 3. This pump may be a typical centrifugal pump used for slurry handling, for example a Warman 3/2 Series A centrifugal slurry pump. An unstable emulsion of oil and water 2 prepared in accordance with the teachings of U.S. application No. 903,580, now U.S. Pat. No. 4,209,301, or alternatively oil alone, is introduced to the slurry on the suction side of the pump in a quantity that will achieve substantially intimate contact between the oil and coal.

By the use of flow controls over solids, water and emulsion, the preferred proportions of coal:water:oil can be admitted to the pump chamber or inlet so that the residence time required for coating the coal matter with oil and agglomerating the coal particles to a size sufficient for separation from the liberated mineral matter is achieved in a single pass through the pump. This reduction in residence time represents a very significant advance over previous studies where much longer residence time have been necessary. Previous studies have used combinations of high speed agitation and/or relatively long residence times to achieve similar results. The present invention produces the required effect in a matter of seconds in many cases, using normal pump speeds, whereas previous studies have required agitator speeds up to 8,000 to 10,000 revs/minute (see for example reference 3) and residence times up to 15 minutes (see for example reference 4) to achieve the necessary intimate contact between the oil and coal.

During passage through the pump sufficient agitation and mixing occurs for the oil droplets to contact the individual coal particles. In this regard, the pump 3 may be likened to a water filled impact crusher and conditions within the pumping chamber are therefore sufficiently turbulent to cause the necessary contact between the oil droplets and the coal particles. The mixture discharged from the pump therefore contains coal matter particles coated with oil together with an aqueous suspension containing clays and other mineral matter particles.

In use it is found that many of the coal particles have agglomerated into small aggregates by this action and can be recovered by immediate physical separation. In this case, the valve $V_1$ is opened so that the agglomerates and refuse slurry are delivered to a separating device 4, such as a simple static screen as shown, where the coal is readily separated from the refuse liquid 6 containing clays and other mineral matter. However, in some cases it may be preferable to cause these aggregates to contact each other further to form larger agglomerates and provide more effective separation from the refuse material.

This further agglomeration can be achieved using many suitable devices, for example, stirred tanks, recirculation via a pump, or some other form of "in line" or external mixing or contacting device.

In the present work it has been found that one suitable means of achieving this contacting is by closing valve $V_1$ and opening vale $V_2$ and pumping the discharge slurry through an "in line" flow promoting device 7 consisting of a helix having a pitch equivalent to twice the diameter of the pipe and a length equivalent to six times the diameter of the pipe. Many alternative configurations of this basic design are possible depending on the nature of the coal and the specific operating conditions.

The helical motion imparted to the slurry causes the oil coated coal particles to contact each other in a manner conducive to forming larger and stronger agglomerates of coal matter. The slurry is then discharged directly from the pipe over the separating device 4.

The operation shown in the FIGURE provides a much simplified method of carrying out the liberation and recovery of coal from slurries containing fine coal. Control of the amount of "oil" or emulsion admitted to the pump inlet may be achieved in any desired manner. For slurries having a stable concentration of coal and stable ash percentage, a flow meter may be used to keep the rate of injection of "oil" or emulsion at the prescribed level. However, where the amount of coal or ash percentage is variable, both the flow rate and the concentration of coal will need to be monitored.

The use of a pump to effect the mixing and coating operation offers significant advantages both practical and economic. A pump is normally required to supply slurry to recovery operations involving selective agglomeration techniques. The present invention therefore makes use of the pump as a mixing chamber thereby avoiding the necessity to incorporate a tank or other separate mixing device for this purpose in many cases.

The optional use of the flow promoting device to achieve improved agglomeration in the discharge pipework from the pump likewise provides an effective "in line" operation without the need for an additional agglomerating device, thus reducing the process time involved in achieving coal agglomerates of the desired size.

The following examples serve more fully to illustrate the invention:

EXAMPLE 1

A slurry containing 20% by weight $-0.5$ mm raw coal having an ash of 29.3% (dry basis) was prepared in a tank fitted with a centrifugal pump of the type referred to above. The suction pipework to the pump was 75 mm diameter. An emulsion containing a 50% (by weight) mixture of diesel oil and water prepared in an ultrasonic homogeniser was metered into this section of pipework at a rate equivalent to an oil addition level of 12% (on dry feed coal basis). The slurry flow rate was approximately 12 m$^3$/h and the slurry was discharged from the pump via a section of 50 mm diameter pipe, 1 m long over a static ½ mm wedge wire screen. The residence time of the slurry in the pump and pipework was approximately 1 second. The coal matter in the form of aggregates was readily separated from the refuse slurry containing the liberated mineral matter with very minor losses of coal matter in the refuse slurry. The ash of the product was 16-19% (dry basis).

EXAMPLE 2

A washery flotation feed slurry having a pulp density of 21.5% and an ash of 19% (dry basis) was treated in the same manner as the slurry used in Example 1. The beneficiated slurry was pumped over the static screen as before to yield a product ash of 7-8% (dry basis).

EXAMPLE 3

The slurry referred to in Example 2 was passed through a smaller 1½/1 Warman centrifugal slurry pump with the same level of oil/water emulsion addition as in Example 1. The slurry was discharged through a 25 mm diameter pipe approximately 1 m long. This test was carried out using a slurry flow rate of 1.8 m$^3$/h and similar results to those noted in Example 2 were achieved.

It should be noted that the centrifugal pumps used in these tests may be operated over a range of flow rates within the manufacturer's specifications, to yield essentially the same final product.

Any centrifugal turbulent flow slurry pump can be utilized in the method of the present invention, and the Warman Series A slurry pumps having a size from 1½/1 to 4/3 produce effective separation and agglomeration of coal particles. Other types and sizes of centrifugal slurry pumps can be utilized, so long as turbulent flow conditions are achieved within the pump chamber. For example, the conditions within the pump chamber of a 12/10 Warman centrifugal slurry pump would be satisfactory and even larger pumps could be successfully used, provided the other factors justified the use of a pump of that size. The particular pump chosen will generally be chosen in order to perform the required pumping duty for the slurry, rather than to optimize mixing conditions for the specific agglomeration step. Therefore, it will normally not be normal to operate the pump over a particularly wide range of conditions. For instance, it would be normal to operate a 3/2 Warman centrifugal slurry pump at a speed between about 1200 and about 2000 revolutions per minute, as higher speeds tend to cause excessive wear on the pump internals, and lower speeds do not make efficient use of the pump capacity. Nevertheless, it has been demonstrated in a Warman Series A 3/2 pump that effective agglomeration of coal particles can be achieved at pump speeds ranging from less than 1000 rpm up tp 2880 rpm. It is believed that pump speeds as high as 5000 rpm could be used to still achieve effective agglomeration of coal particles, but it is most unlikely that such high pump speeds would ever be used in commercial practice. For larger centrifugal pumps lower speeds would normally be used due to the larger impeller diameters. For example, it would be normal to operate a 12/10 Warman centrifugal slurry pump in a speed range of approximately 500 to 900 revolutions per minute.

It is believed that the agglomeration/pelletization method of the present invention works because firstly the high turbulence in the pump chamber ensures rapid coating of the coal particles with oil, and secondly the high shear rate in the pump chamber (such, as for instance, compared with an agitated tank) and relatively small volume of the pump chamber (again, compared to an agitated tank) both result in an increase in the number of collisions between oil-coated coal particles, resulting in rapid separation of the mineral matter from the coal particles and agglomeration of the coal particles to form pellets.

The centrifugal turbulent flow slurry pumps normally have a pump chamber volume significantly smaller than the volume of a typical agitated tank used in the prior art agglomeration processes. The volume of the pump chamber will depend on the pump design and capacity. The standary 3/2 Warman series A pump used in the above described examples has a pump chamber volume of approximately 2 liters. The 3/2 Warman High Head Pump has a larger volume but still would produce acceptable results. Larger pumps of course have larger pump chamber volumes but the volume is still significantly smaller than that of a typical agitated tank.

The coal slurry which is to be pelletized should be subjected to a shear rate of 200 to 3500 s$^{-1}$ under most practical circumstances, in order for the optimum results of pelletization to be achieved, but in some extreme circumstances an upper shear rate figure of as high as 5000 s$^{-1}$ may be utilized, with pelletization still resulting. For instance, a 3/2 Warman Type A pump, operating at a speed of 1700 rpm, in pumping a slurry having a concentration of 50% by weight of coal at a flow rate of approximately 40 m$^3$/h (with an impeller tip speed of 17.6 ms$^{-1}$ and a gap width between the impeller and pump casing of 0.01 m), a shear rate of 1760 s$^{-1}$ would be experienced. The mean residence time of the coal slurry in the pump chamber would be approximately 0.2 seconds. Notwithstanding the extremely short residence time compared to the prior art agitated tank method, agglomerate pellets are produced enabling dewatering to take place in close proximity to the pump outlet if desired. Larger pumps do not produce significantly longer mean residence times. For example, the mean residence time in a 12/10 Warman should not be greater than about 1 second.

While water is the preferred liquid in which the coal particles are slurried, it will be readily appreciated by those in the art that the other liquids could also be utilized, but for economic considerations it is anticipated that only water will be utilized in most commercial applications of the present invention.

The agglomerating oil may be injected directly into the pump, or may be introduced into the coal bearing slurry just upstream of the pump. It is preferred that the agglomerating oil be injected into the coal bearing slurry at a location no more than 10 meters from the pump itself, and preferably within 5 meters of the pump location.

It is to be recognized that the method of the present invention produces pellets rather than soft flocs of the coal particles. By pellets the present specification refers to relatively hard, dense agglomerates of coal particles which can be readily separated from the water and suspended mineral matter, using simple recovery techniques, such as screens or the like. The pellets will normally resist significant breakage due to normal handling operations of separation and recovery, unlike the soft flocs of coal particles, which will normally be broken into smaller size particle agglomerates during normal handling operation and are not therefore above to be recovered by means of screens and the like.

The weight ratio of pelletizing oil used to coal content of the slurry will generally be within the range of 0.08-0.25, and preferably about 0.12, although it will be readily appreciated that greater amounts of pelletizing-/agglomerating oil could be utilized without adversely affecting the process of the present invention. In this event, however, no advantages would accrue to the use of increased amounts of oil, and the economics of the process would likely be adversely affected, so that such greater amounts of oil would normally be avoided.

The amount of agglomerating oil added to the slurry will vary depending upon a number of factors, such as the coal concentration in the slurry, a particular type of coal in the slurry, the particular turbulence and shear generated in the particular pump utilized, and other variables which would be clear to the art.

What we claim is:

1. In a method of recovering coal from a particulate coal bearing slurry comprising agitating said slurry in the presence of an appropriate hydrophobic liquid and subsequently separating coal from the slurry, the improvement comprising substantially reducing the time to recover coal from said slurry liquid by forming said particulate coal into agglomerate pellets of dimensions to be readily separated from said slurry liquid by introducing the slurry to the inlet of a centrifugal turbulent flow slurry pump having a pumping chamber, introducing said hydrophobic liquid into said pumping chamber simultaneously with said slurry in a quantity sufficient to achieve substantially intimate contact between said hydrophobic liquid and said coal particles, passing said slurry and said hydrophobic liquid through said pump in a single pass to subject the coal particles to extreme turbulence within the pumping chamber to rapidly coat the coal particles with the hydrophobic liquid and to repeatedly bring the coal particles into contact with other coal particles in the pumping chamber to agglomerate and pelletize the coal particles in the pumping chamber, whereby the coal may be readily separated from the slurry liquid and whereby the time taken for the recovery of the coal from the slurry liquid is substantially reduced.

2. The coal recovery method of claim 1, further comprising the step of additionally agitating the slurry before separation of said coal to achieve additional contact between the agglomerated coal particles produced by the agitation within said pump chamber whereby larger agglomerates are produced.

3. The coal recovery method of claim 2, wherein said further agitation is achieved by an agitating means in a pipeline connected to the pump outlet.

4. The coal recovery method of claim 3, wherein said agitating means comprises an in-line flow promoting device.

5. The coal recovery method of claim 4, wherein said flow promoting device causes the coal containing slurry to move in an helical path thereby causing the coal particles to contact each other to form said larger agglomerates.

6. The coal recovery method of claim 1, wherein said hydrophobic liquid is introduced in the form of an unstable emulsion of oil and water.

7. The coal recovery method of claim 1, wherein said slurry and said hydrophobic liquid are subjected to shear rates of about 200 to about 3500 $s^{-1}$ within said pumping chamber.

8. A system for recovering coal in the form of pellets from a particulate coal bearing slurry comprising (a) a pipeline for carrying the slurry; (b) a centrifugal turbulent flow slurry pump having a pumping chamber connected to said pipeline for pumping said slurry; (c) feed means for introducing an appropriate hydrophobic liquid to the pumping chamber of said pump simultaneously with the introduction of said slurry into said pumping chamber in a metered quantity sufficient to achieve substantially intimate contact between the hydrophobic liquid and the coal particles in said slurry, said pump means and said feed means co-operating to pass said slurry and said hydrophobic liquid through said pump in a single pass and to subject the coal particles to extreme turbulence within the pumping chamber to rapidly coat the coal particles with the hydrophobic liquid and to repeatedly bring the coal particles into contact with other coal particles in the pumping chamber to agglomerate and pelletize the coal particles in the pumping chamber; and (d) separating means for separating the pelletized coal particles from said slurry upon discharge from said pump whereby the time taken for the recovery of the coal from said slurry is substantially reduced.

9. The coal recovery system of claim 8, further comprising means for additionally agitating the slurry before separation of said coal therefrom to achieve additional contact between the agglomerated coal particles produced by the agitation within said pump chamber whereby larger agglomerates are produced.

10. The coal recovery system of claim 9, wherein said means for additionally agitating said slurry comprises agitating means within a pipeline connecting said pump and said separating means.

11. The coal recovery system of claim 10, wherein said means for additionally agitating said slurry comprises a section of said pipeline downstream of said pump, said section of pipeline being in the form of a helix having a pitch substantially equivalent to twice the diameter of said pipeline and a length substantially equivalent to six times the diameter of said pipeline.

12. The coal recovery system of claim 8, wherein said system further comprises means for producing an unstable emulsion of oil and water for introduction to said pump chamber simultaneously with the introduction of said slurry.

13. The coal recovery system of claim 8, wherein said pump is such as to produce shear rates of about 200 to about 3500 $s^{-1}$ in said pump chamber.

* * * * *